Nov. 10, 1964   J. W. McGUFFEY   3,156,101
TRUCK REFRIGERATION SYSTEM
Filed March 4, 1963   3 Sheets-Sheet 1
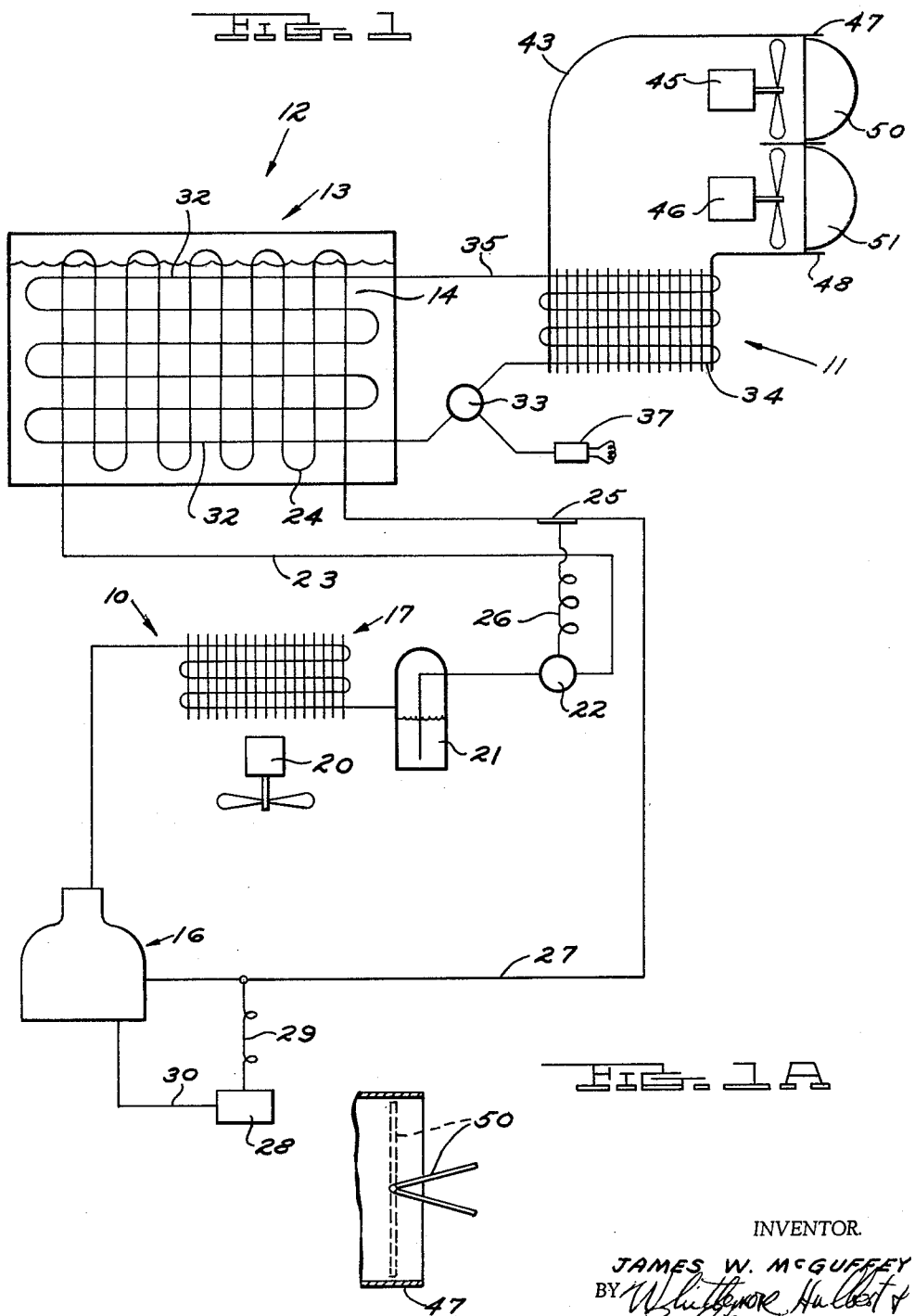
INVENTOR.
JAMES W. McGUFFEY
BY Whittemore, Hulbert &
Belknap
ATTORNEYS

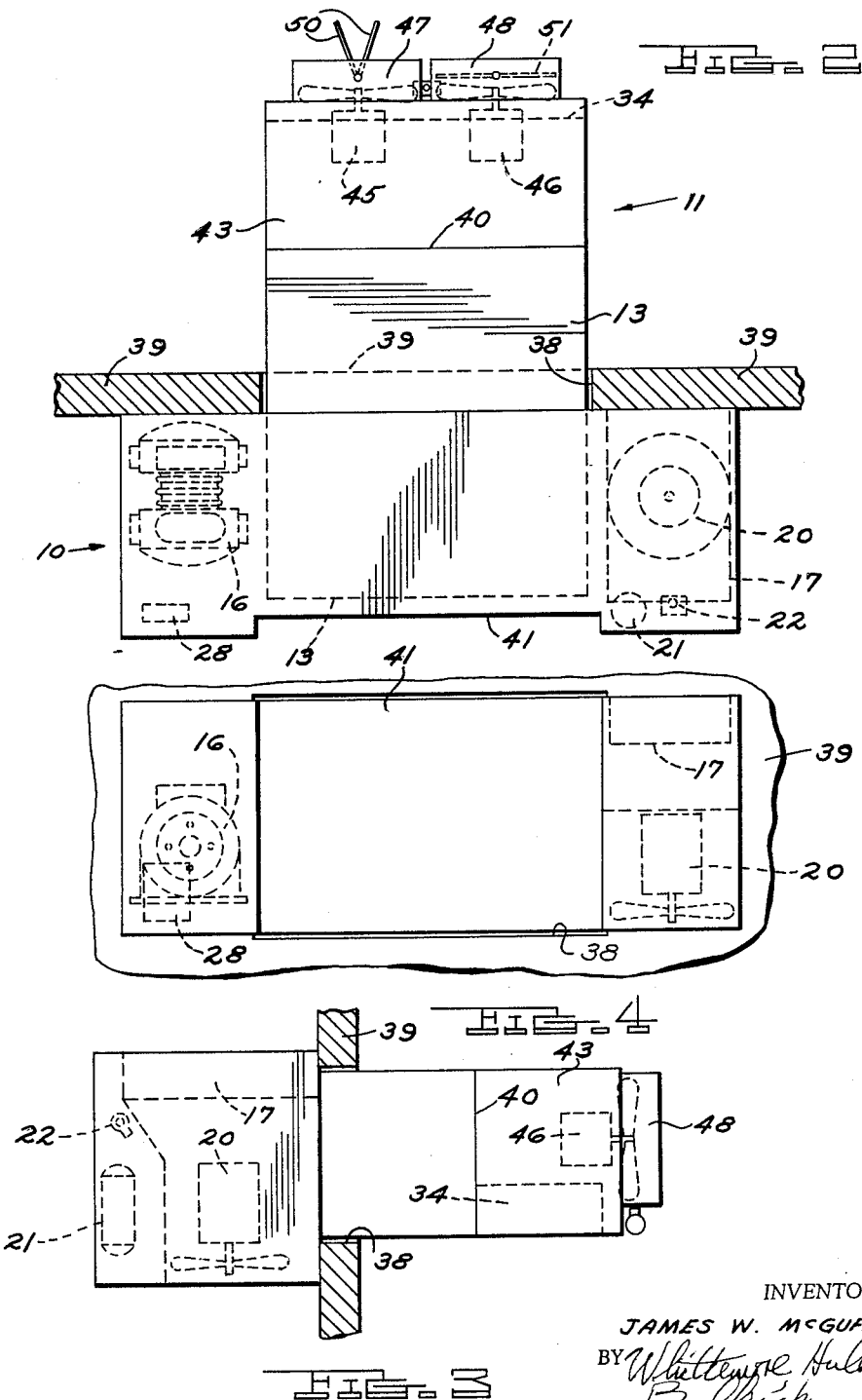

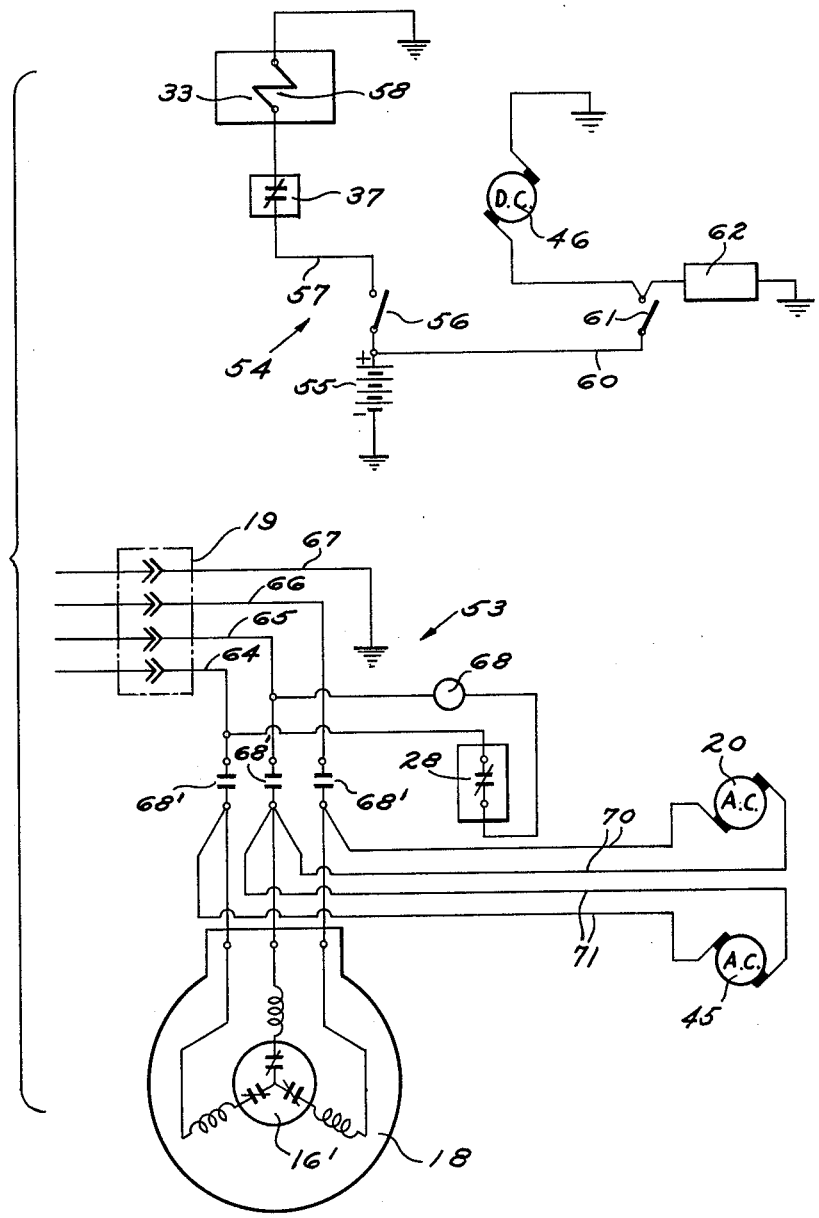

United States Patent Office 3,156,101
Patented Nov. 10, 1964

3,156,101
TRUCK REFRIGERATION SYSTEM
James W. McGuffey, Lansing, Mich., assignor to Tranter Manufacturing, Inc., Lansing, Mich., a corporation of Michigan
Filed Mar. 4, 1963, Ser. No. 262,440
4 Claims. (Cl. 62—223)

The present invention relates to an improved refrigeration system for automotive trucks and other vehicles having a body interior to be refrigerated for the purpose of refrigerating the load of the vehicle body in transit. More particularly, the invention relates to a combined system including a relatively large vessel or container of freezable liquid, preferably a known eutectic solution, together with a primary refrigerating circuit employed to freeze this liquid overnight in standby, when the vehicle is not in transit; and a secondary refrigerating circuit through the agency of which the interior body heat of the vehicle is caused to be absorbed in the melting of the frozen eutectic mass during over-the-road transit of the vehicle, thus maintaining the temperature of the body interior at a desired low level in this phase.

In accordance with the invention, the primary and secondary refrigerating circuits, and the eutectic vessel and its content which thermally coordinate the two, are mounted as a "package" on the vehicle, the heat from the air of the body interior being continuously transferred to the eutectic in over-the-road operation and being intermittently passed on to the outside air during overnight layover.

Various sorts of truck refrigeration apparatus of the so-called "hold-over" type are known to the art, characterized by one or more independent sealed containers containing a liquid solution which is frozen before use, the same being then suitably disposed in the truck interior to absorb heat and cool the load in over-the-road operation. The patents to Orton S. McGuffey Nos. 2,287,941, of June 30, 1942, and 2,855,764, of October 14, 1958, illustrate improvements in refrigerated hold-over plate structure of this general character.

Likewise, truck refrigerating systems are well known in the art, wherein the truck is equipped with a complete refrigerating circuit, including condenser, receiver, evaporator and other conventional adjuncts; and the patents to Orton S. McGuffey et al. No. 2,880,595, of April 7, 1959, and James W. McGuffey No. 2,975,614, of March 21, 1961, are illustrative.

The general object of the present invention is to provide a self-contained refrigerating system for truck and like refrigerated vehicle bodies, wherein certain features of both of the above truck refrigerating principles are employed, but in a combination of features thereof which to my knowledge is new in the vehicle refrigeration art.

In accordance with the invention, the refrigeration "package" contemplated thereby is mounted as a unitary assembly upon the vehicle. This includes a large vessel or tank containing a suitable low melting point eutectic solution, in which the evaporator coil of a primary refrigeration circuit is immersed, the remainder of the primary circuit being disposed forwardly of the forward wall or bulkhead of the vehicle interior and the eutectic projecting partially to the rear of said interior; and a secondary refrigerating circuit having its condenser coil also immersed in the eutectic mass, the remainder of the secondary circuit being disposed within the body interior of the vehicle.

In further accordance with the invention, the tank or vessel referred to is made sufficiently large to contain, in a single mass, enough eutectic solution to absorb the anticipated daily heat gain of the truck body interior. The secondary system, as disposed within the body interior, includes a finned secondary evaporator communicating through a solenoid valve with the eutectic-immersed condenser coil of the secondary circuit. Accordingly, warm air of the body interior, in being passed over the secondary evaporator coil, evaporates liquid refrigerant contained in the latter. However, since the heat exchange surface of the secondary condenser coil, as frozen in a solid mass of eutectic solution, is at a lower temperature than the secondary evaporator coil, the evaporator refrigerant in the latter seeks this lower temperature and, assuming proper refrigerant pressure for this to take place, condenses into a liquid. Such condensation releases heat which, as the secondary evaporator coil discharges to the secondary condensor coil in the eutectic mass, is absorbed by the eutectic in the thawing of the latter. The primary refrigerating circuit removes the heat from the eutectic in freezing the latter in overnight layover, by the circulation of its own refrigerant medium through its own evaporator coil immersed in the eutectic solution; and the heat is discharged into the air.

In further accordance with the invention, the secondary refrigerant circuit, as mounted within the interior of the truck body, includes a pair of fans causing the flow of air past the secondary evaporator coil. One of these may be an A.C. motor driven fan adapted to be plugged into a suitable source for overnight operation, and the other is a D.C. motor operated fan wired in the vehicle's electrical system for over-the-road operation. Likewise, the invention contemplates the provision of individual check valves at the discharge area of these fans, only one of which is driven at a time, so that in the operation of either fan, air will not be recirculated through the discharge opening of the non-operating fan, thus bypassing circulation through the secondary evaporator coil.

Yet another object of the invention is to provide a combined refrigerating circuit including a mass of eutectic solution which is frozen during one period, with the evaporator coil of the primary refrigerating provisions for this purpose immersed along with the condenser coil of the secondary circuit in the eutectic mass, and a suitable intermittently operated valve, responsive to temperature of air in the refrigerated vehicle interior prior to passing the secondary evaporator coil. Such valve controls the flow of cold refrigerant medium from the immersed secondary condenser coil to the secondary evaporator coil, allowing circulation only when refrigeration is needed.

In further accordance with the invention, the circulation controlling valve in question is solenoid operated, drawing only a slight amount of current, so that it may be connected in the battery circuit of the vehicle and thus able to control refrigeration needs of the vehicle interior in either over-the-road or standby operation.

Another object of the invention is to provide a combined refrigeration system as described, in which the flow of refrigerant, as warmed and evaporated in the secondary evaporator and condensed under cooling in the immersed secondary coil, is maintained at a proper pressure level to permit the desired evaporating and condensing actions in such a thermo-siphon system. This also involves the proper positioning of the secondary evaporator to avail the system of gravity potential to assist the thermo-siphon action.

Yet another object is to provide a combined refrigerant circuit wherein provision is made to maintain circulation of relatively warm body interior air past the secondary evaporator coil, whether refrigeration is needed or not, and the temperature sensitive solenoid valve is opened or closed, thus to prevent collection of frost on the secondary evaporator tending to block passage of air and result in deteriorated performance.

A still further object is to provide an improved unitary and built-in vehicle refrigeration system incorporating a large eutectic mass to be frozen, in which the primary refrigeration circuit of the system includes a motor driven compressor and the pressure control means sensitive to pressure of refrigerant in this circuit, hence its temperature, which functions to terminate operation of the primary circuit compressor when the eutectic is frozen.

The general purposes of the invention are to provide an improved, combined primary and secondary circuit refrigerating system, especially designed for installation as a unit on a vehicle, which is of light weight, as compared with known employed systems of the hold-over plate type, and more readily installed; which provides for a positive air flow in the refrigerated interior; and which makes possible a desiredly controllable temperature, by a suitable selection of operating pressures and circulated refrigerant and eutectic media. As compared with known types of mobile systems incorporating in each a complete conventional refrigerating circuit, the present system affords greater reliability, absence of need for engine connections, pumps, shafts or other auxiliary power sources; absence of moving parts in over-the-road operation, save for the secondary evaporator fan powered from the vehicle's electrical circuit, and reduced overall operating cost, since only a conventional alternating current power source is utilized in standby operation.

The foregoing as well as other objects will become more apparent as this description proceeds, especially when considered in connection with the accompanying drawings illustrating the invention, wherein:

FIG. 1 is a schematic view very conventionally showing components and operating connections of the improved combined system;

FIG. 1A is a schematic detail in plan showing the arrangement of a butterfly check valve at the discharge of one of the evaporator fans of the system;

FIG. 2 is a top plan view more or less schematically showing the layout of the package unit of the invention in relation to the forward wall or bulkhead of the truck body interior, which is shown in horizontal section;

FIG. 3 is a view of the unit in side elevation, with the bulkhead appearing in vertical section;

FIG. 4 is a front elevational view of the unit; and

FIG. 5 is a schematic wiring diagram showing electrical connections of various components respectively to a standby electrical source and to the electrical system of the truck.

Referring first to FIG. 1, the combined system of the invention basically comprises a primary refrigeration circuit 10 which is substantially conventional, save for the disposition of its evaporator coil, to be described; a secondary refrigeration circuit 11; and a eutectic unit 12 containing components of both the refrigerant circuits 10 and 11 and thus integrating these circuits in a thermal sense. Eutectic unit 12 includes a relatively large tank or vessel 13 filled with sufficient of a suitable eutectic solution 14 to absorb, after freezing and during a day's over-the-road operation, the heat gain of the truck interior.

The primary refrigeration circuit 10 comprises a motor-driven compressor 16 conventionally connected to a condenser coil 17. Compressor 16, as equipped with a thermally responsive three phase overload switch 16' is driven by a motor 18, shown in FIG. 5, adapted to be plugged into a standard electrical circuit including an alternating current source through the agency of a plug-in connector 19. A primary circuit condenser fan 20 is also adapted to have its motor energized from the same electrical source. Primary condenser coil 17 conventionally leads to a receiver tank 21, which discharges through a conventional thermal expansion valve 22, from which a refrigerant line 23 connects to the evaporator coil 24 of the primary refrigeration circuit. Expansion valve 22 is conventionally controlled by a bulb 25, mounted to the discharge end of evaporator coil 24, and connected to valve 22 through a capillary line 26. The evaporator returns through a line 27 to the primary compressor 16; and a suitable pressure control unit 28, sensitive to refrigerant pressure in return line 27 through a connection 29, has a connection 30 to the motor 18 of compressor 16. Thus, the setting of the pressure control 28 is such that the latter, in detecting refrigerant pressure, and thus refrigerant temperature, in the primary circuit, terminates operation of compressor 16 when the eutectic mass 14 in tank 13 is frozen.

The eutectic-containing tank 13 is a wholly enclosed and well insulated one, being sealed under vacuum to remove air. It has immersed in its eutectic content 14, in addition to the evaporator coil 24 of primary refrigeration circuit 10, a condensing coil 32 of the second refrigeration circuit 11. Coil 32 is connected through a solenoid operated valve 33 exterior of the tank 13 with a finned evaporator coil 34 of secondary circuit 11, which coil 34 returns to secondary condenser coil 32 through a conduit 35. The solenoid valve 33 is electrically responsive to and controlled in its opening and closing movements by an air temperature thermostat 37 which is disposed in the truck body interior to be refrigerated. Thus, when refrigeration is needed in the latter, the thermostat 37 opens solenoid valve 33, allowing cold refrigerant liquid to circulate into secondary evaporator coil 34, the circulation being stopped when the needed level of refrigeration is reached. As illustrated in FIG. 5, solenoid valve 33 is wired in the truck battery circuitry, to perform either over the road or on standby at a small drain on the battery.

Reference now being had to FIGS. 2, 3, and 4, it is seen that the eutectic vessel or tank 13 extends through an opening 38 in the forward wall or bulkhead 39 of the refrigerated interior of the truck body, the rear wall of the tank being indicated by the reference numeral 40. In the interest of conserving load space, the tank projects forwardly of bulkhead 39 into a suitable housing 41 on the foreside of bulkhead 39, the primary compressor 16 and its pressure control 28 being mounted in housing 41 on one side of the forward tank end, with the primary condenser 17, its fan and motor 20, the receiver 21 and thermal expansion valve 22 mounted on the opposite side of the tank. The intake of condenser 17 is from the top of housing 41, and the condenser fan discharges downwardly of the housing.

The secondary evaporator coil 34 is disposed at the bottom or intake side of a fan housing 43 to the rear of eutectic tank 13. Being a warmer, heat absorbing unit, the evaporator coil 34 is located at this low level to take advantage of gravity potential for energy in forcing the cold liquid refrigerant leaving secondary condenser coil 32 to the warm region for evaporation. The evaporated gas will then return to coil 32 because of density difference, in a typical thermo-siphon circuit.

In this connection, it is important that the pressure on the circulating refrigerant medium be correct within a predetermined range, for insufficient pressure will prevent the medium evaporated in secondary coil 34 from properly condensing in coil 32, while excessive pressure will prevent the liquid from properly evaporating in coil 34. Therefore, the pressure in the refrigerant circulating line of coils 32 and 34 is predeterminedly set upon initial charging of this circulatory line, depending upon the nature of the refrigerant employed, and the respective temperatures at which this medium is to be condensed and evaporated. For example, assuming the use of a medium known in the industry as Refrigerant 12, and that the truck interior is to be refrigerated to approximately 35° F. and condensed at 12° F., the saturation pressure at the former temperature will be 32.5 p.s.i. and at the latter temperature 15.8 p.s.i. The pressure setting for the secondary evaporator-condenser line should therefore be within these limits; and experience shows that it should be closer to the higher than to the lower, for example in the range 27 p.s.i.–30 p.s.i.

The draft of air past secondary evaporator coil 34 is occasioned by one or the other of a pair of motorized fans 45, 46 disposed in horizontally spaced relation to one another in separated chamber portions 47, 48 at the discharge end of fan housing 43. The motors of fans 45, 46 are respectively wired into a standard A.C. voltage supply line, and into the truck electrical circuitry in the manner shown in FIG. 5.

Two fans are required, one designated 45 driven by an A.C. motor for the circulation of air at night standby and the other driven by a D.C. motor which is connected with the truck ignition switch. These motors respectively run continuously in the over-the-road and standby cycles. When the truck engine is not running the D.C. motor is inactive, preventing discharging of the truck battery.

However, when two fans are employed, only one of which runs at night, air from the interior to be refrigerated tends to be pulled back through the discharge of the inactive fan, causing it to windmill, and this air thus bypasses the finned secondary evaporator coil 34 with resultant diminished performance.

Therefore, as shown in FIGS. 1, 1A and 2, the invention contemplates the provision of a pair of double-winged butterfly air check valves 50, 51 pivoted on upright axes across the discharge areas of the respective fan housing subdivisions 47, 48. Thus, when one of the fans 45, 46 is in operation, the force of its air discharge causes its butterfly valve 50 or 51 to blow open and, conversely, the fan in question exerts a suction on the other butterfly valve 51 or 50 causing it to close, and thereby preventing the bypassing of air in reference to the finned secondary evaporator coil 34. The action is shown in FIG. 2.

It is believed that the operation of the combined frozen eutectic and thermo-siphon system, in which thawing of an eutectic to absorb from a circulating refrigerant and release heat withdrawn from a refrigerated interior is accompanied by the recondensing of a refrigerant whose evaporation is responsible for the withdrawal, will be apparent from the preceding description.

In the first place, the pressure controlled unit 28 of the primary refrigeration system 10 governs the compressor 16 by terminating operation of the latter when the eutectic mass 14 is frozen. It does this by sensing the temperature-responsive pressure of the refrigerant returning in line 27 from the eutectic tank 13 to the intake of compressor 16. Either one of the fans 45, 46 causes warm air from the truck body interior to be passed over the finned tube coil of secondary evaporator 34, evaporating liquid refrigerant contained in this coil. The frozen eutectic mass 14 in tank 13 cools refrigerant in secondary condenser coil 32, which is piped at the lower temperature to the finned tube evaporator 34. As the result refrigerant in the latter evaporated by the passage of warm body air will seek an equilibrium of temperature, or cool and condense into a liquid, always on the assumption that refrigerant pressure has been set appropriately for the respective evaporating and condensing actions to take place, in the manner described above. In turn, condensation of the refrigerant will release heat to the eutectic mass at coil 32, which heat is absorbed by the eutectic in the thawing of the latter. At a later time this heat is removed from the thawed eutectic in the refreezing of the latter by the primary refrigeration circuit 10. When in over-the-road operation, with the fan 46 active, the solenoid valve 33, in response to the needs of the vehicle interior for refrigeration, controls the flow of liquid refrigerant to secondary evaporator 34 to satisfy the existing need.

It happens that, in refrigerating a truck interior to the instanced approximately 35° F., the refrigerant and finned coil temperature will be significantly below 32° F., so that frost would ordinarily collect at the secondary evaporator 34 and tend to block air passage therethrough, with resultant deteriorated performance. This problem is met by allowing one of the fans, 45, 46, to run all of the time that the system is active. Thus, when no refrigeration is needed and refrigerant flow is halted by valve 33, the relatively warm body air continues to be circulated over the finned coil, and its heat (35° F.) will melt any previously accumulated frost.

FIG. 5 of the drawings shows the electrical circuitry of the improved system, which circuitry includes two sections, i.e., a primary circuit, generally designated 53, powered from an appropriate alternating current standby source, and a secondary circuit, generally designated 54, powered from the usual grounded 12 volt battery 55 of the truck electrical system. The circuit 54 is preferably controlled by a manual switch 56 connected to the positive terminal of battery 55, or to a voltage regulator (not shown) connected in the system at this point. Flow of current upon closure of switch 56 is through a lead 57 to a terminal of the thermostat or thermostat switch 37 which, when closed, energizes the coil 58 of solenoid valve 33, the coil being grounded. Thus solenoid operating power is available at all times when the switch 56 (preferably located upon the dashboard of the truck) is closed, whether the truck is operating or not. The current involved is very low, approximating 0.1 ampere, so that the drain on battery 55 is negligible.

The D.C. circuit 54 includes a parallel leg supplied through a lead 60 to the motor of the 12 volt D.C. evaporator fan 46 (the fan designations 20, 45 and 46 being employed in FIG. 5 to designate the respective motors of such fans), this parallel circuit portion including the truck ignition switch 61 controlling the remainder of the grounded truck ignition and lighting circuit, conventionally designated 62.

It is seen that the refrigeration dashboard switch 56 affords a means for de-energizing the coil 58 of solenoid valve 33 in the event the truck is to be parked for a considerable length of time, with its refrigeration equipment unused, thus preventing a needless drain on the battery 55 at even the low amperage value which is involved. It is also seen that the 12 volt evaporator fan 46 operates only when the truck engine is in operation, i.e., in over-the-road duty ordinarily.

The standby electrical circuit 53 is supplied through the plug-in connector 19 from a suitable 220 volt, three phase, 60 cycle source, through four leads 64, 65, 66 and 67, the latter of which is grounded. The pressure control unit 28, operating in response to compressor discharge and suction pressure, is connected in series with a relay 68 whose contacts 68' are included in connection from the leads 64, 65 and 66 to the three phase terminals of the compressor motor 18. As connected in series with pressure control 28, the relay 68 is connected to the intermediate lead 65, with the pressure control completing a circuit to one of the other leads 64. Pairs of leads 70 and 71 respectively connect the motor of primary condenser fan 20 and the A.C. motor of secondary evaporator fan 45 with the compressor motor leads. Thus both of the A.C. fans 20 and 45 and the compressor motor 18 are energized when the circuit 53 is plugged into the standby source at plug-in connector 19.

Although the standby electrical circuit 53 is illustrated as being electrically supplied from a three phase source, it is contemplated that the alternating current motors 20 and 45 may also be energized from a single phase voltage supply, with no significant change in function or performance.

It is seen that the invention affords a unit incorporating principles of operation of previous holdover plate and mobile refrigeration systems, attaining advantages not fully attained by either of these systems in point of lighter weight and easy installation, positive air flow under controllable temperature, great reliability at very low operating cost, and freedom from reliance upon engine driven provisions, as well as being characterized by an absolute minimum of moving parts, as compared with existing types of built-in refrigerating circuits.

What I claim as my invention is:

1. The combination in a temperature conditioning or refrigerating system of means providing a first refrigerating circuit, a vessel adapted to contain a quantity of a low melting point medium, and means providing a second refrigerating circuit, said first circuit including a refrigerant circulating evaporator coil disposed in said vessel to be immersed in said medium to refrigerate the latter by absorbing heat therefrom, said second circuit including a refrigerant circulating condenser coil similarly disposed in said vessel to be refrigerated by said medium upon absorption into the latter of heat from the condenser coil, a refrigerant circulating evaporator coil of said second circuit disposed externally of said vessel, means placing said condenser and evaporator coils of said second circuit in communication with one another, the flow of refrigerant in said coils of said second circuit, other than as affected by temperature change, being under thermal draft at a predetermined, substantially constant pressure, and means to circulate air to be refrigerated past the evaporator coil of said second circuit, said air circulating means comprising a pair of fans having adjacent separate discharges and driven respectively by separate sources, each of said fans having check valve means at the discharge thereof to prevent circulation by either one thereof through the other and not past the evaporator coil of said second circuit.

2. The combination in a temperature conditioning or refrigerating system of means providing a first refrigerating circuit, a vessel adapted to contain a quantity of a low melting point medium, and means providing a second refrigerating circuit, said first circuit including a refrigerant circulating evaporator coil disposed in said vessel to be immersed in said medium to refrigerate the latter by absorbing heat therefrom, said second circuit including a refrigerant circulating condenser coil similarly disposed in said vessel to be refrigerated by said medium upon absorption into the latter of heat from the condenser coil, a refrigerant circulating evaporator coil of said second circuit disposed externally of said vessel, means placing said condenser and evaporator coils of said second circuit in communication with one another, including a valve adapted to control the flow of refrigerant therebetween, the flow of refrigerant in said coils of said second circuit, other than as affected by temperature change, being under thermal draft at a predetermined, substantially constant pressure, and means to circulate air to be refrigerated past the evaporator coil of said second circuit, said air circulating means comprising a pair of fans having adjacent separate discharges and driven respectively by separate sources, each of said fans having check valve means at the discharge thereof to prevent circulation by either one thereof through the other and not past the evaporator coil of said second circuit.

3. The combination in a temperature conditioning or refrigerating system of means providing a first refrigerating circuit, a vessel adapted to contain a quantity of a low melting point medium, and means providing a second refrigerating circuit, said first circuit including a refrigerant circulating evaporator coil disposed in said vessel to be immersed in said medium to refrigerate the latter by absorbing heat therefrom, said second circuit including a refrigerant circulating condenser coil similarly disposed in said vessel to be refrigerated by said medium upon absorption into the latter of heat from the condenser coil, a refrigerant circulating evaporator coil of said second circuit disposed externally of said vessel, means placing said condenser and evaporator coils of said second circuit in communication with one another, including a valve adapted to control the flow of refrigerant therebetween, the flow of refrigerant in said coils of said second circuit, other than as affected by temperature change, being under thermal draft at a predetermined, substantially constant pressure, means to circulate air to be refrigerated past the evaporator coil of said second circuit, and means responsive to the temperature of said air to actuate said valve for the control of said refrigerant flow, said air circulating means comprising a pair of fans having adjacent separate discharges and driven respectively by separate sources, each of said fans having check valve means at the discharge thereof to prevent circulation by either one thereof through the other and not past the evaporator coil of said second circuit.

4. The combination in a temperature conditioning or refrigerating system of means providing a first refrigerating circuit, a vessel adapted to contain a quantity of a low melting point medium, and means providing a second refrigerating circuit, said first circuit including a refrigerant circulating evaporator coil disposed in said vessel to be immersed in said medium to refrigerate the latter by absorbing heat therefrom, and means responsive to pressure in said coil to control the refrigeration of said medium, said second circuit including a refrigerant circulating condenser coil similarly disposed in said vessel to be refrigerated by said medium upon absorption into the latter of heat from the condenser coil, a refrigerant circulating evaporator coil of said second circuit disposed externally of said vessel, means placing said condenser and evaporator coils of said second circuit in communication with one another, including a valve adapted to control the flow of refrigerant therebetween, the flow of refrigerant in said coils of said second circuit, other than as affected by temperature change, being under thermal draft at a predetermined, substantially constant pressure, means to circulate air to be refrigerated past the evaporator coil of said second circuit, and means responsive to the temperature of said air to actuate said valve for the control of said refrigerant flow, said air circulating means comprising a pair of fans having adjacent separate discharges and driven respectively by separate sources, each of said fans having check valve means at the discharge thereof to prevent circulation by either one thereof through the other and not past the evaporator coil of said second circuit.

References Cited in the file of this patent
UNITED STATES PATENTS

| | | |
|---|---|---|
| 1,865,513 | Gaugler | July 5, 1932 |
| 2,075,225 | Post | Mar. 30, 1937 |
| 2,096,065 | Ruppricht | Oct. 19, 1937 |
| 2,144,794 | Cobb | Jan. 24, 1939 |
| 2,252,979 | Reiter et al. | Aug. 19, 1941 |
| 2,512,545 | Hazard | June 20, 1950 |
| 2,526,398 | Oaks | Oct. 17, 1950 |
| 2,880,595 | McGuffey et al. | Apr. 7, 1959 |
| 2,884,768 | Gould | May 5, 1959 |